United States Patent [19]

Armstrong

[11] Patent Number: 5,389,404
[45] Date of Patent: * Feb. 14, 1995

[54] APPLYING CATALYST AND COATING COMPOSITION CONTAINING SAME TO A SUBSTRATE

[75] Inventor: Stephen Armstrong, Braine L'Alleud, Belgium

[73] Assignee: Dow Corning S.A., Seneffe, Belgium

[*] Notice: The portion of the term of this patent subsequent to Dec. 28, 2010 has been disclaimed.

[21] Appl. No.: 109,019

[22] Filed: Aug. 19, 1993

Related U.S. Application Data

[62] Division of Ser. No. 863,920, Apr. 6, 1992, Pat. No. 5,273,946.

[30] Foreign Application Priority Data

Apr. 20, 1991 [GB] United Kingdom ............... 9108510

[51] Int. Cl.$^6$ ........................... B05D 3/02; B01J 37/04
[52] U.S. Cl. ........................... 427/387; 427/391; 427/393.5; 428/447; 428/451; 428/452; 502/158

[58] Field of Search ............... 502/158, 159; 427/387, 427/391, 393.5

[56] References Cited

U.S. PATENT DOCUMENTS 5,273,946 12/1993 Armstrong .................. 502/158

*Primary Examiner*—Paul E. Konopka
*Attorney, Agent, or Firm*—Robert L. McKellar

[57] ABSTRACT

Progress for preparing a catalyst for hydrosilylation reactions which comprises reacting (A) a rhodium complex $Rh(R_2S)_3X_3$, in which R represents alkyl and other specified hydrocarbon groups and X represents Cl or Br with (B) an organohydrogen polysiloxane in the presence of (C) an organosiloxane having silicon-bonded vinyl or allyl groups. The ratio of silicon-bonded hydrogen atoms provided by (B) to each Rh atom provided by (B) is in the range from 0.5:1 to 6.0:1.

The invention also includes the use of the catalyst for reacting ≡SiH with ≡Si Alkenyl especially in compositions for the treatment of substrates such as paper and plastics.

8 Claims, No Drawings

APPLYING CATALYST AND COATING COMPOSITION CONTAINING SAME TO A SUBSTRATE

This is a divisional application of Ser. No. 07/863,920, filed on Apr. 6, 1992, now issued as U.S. Pat. No. 5,273,946 on Dec. 28, 1993.

This invention relates to a process for the preparation of an improved hydrosilylation catalyst. It relates also to compositions containing said catalyst and the use of said compositions for coating substrates.

The use of platinum group metals, their compounds and complexes as catalysts for reactions involving the addition of $\equiv$SiH groups to olefinically-unsaturated groups is well known in the organosilicon art. Illustrative of such catalysts are platinum supported on carbon, chloroplatinic acid, complexes of platinic chloride and unsaturated organic compounds and compounds and complexes of rhodium as described in, for example, GB Patent Specification 1 041 237.

One important commercial application of such catalysts is as a component of compositions for imparting release (non-stick) properties to substrates such as paper and plastic film. Coating compositions of this type have been described in G.B. Patent Specification 1 476 314 which discloses a process for coating a surface which comprises applying thereto a composition comprising (1) a polydiorganosiloxane in which some of the organic substituents are vinyl groups, (2) an organohydrogenpolysiloxane and (3) a catalyst for the addition of $\equiv$SiH groups to silicon-bonded vinyl groups comprising one or more rhodium complexes of the formula $RhX_3(SR_2)_3$ or $Rh_2(CO)_4 X_2$ in which R and X have specified values. Said rhodium complexes have certain advantages when compared with the more widely employed platinum catalysts. For example, they provide coating compositions having a reasonably long bath life, thus reducing the need for added inhibitors, and also in the cured state give stable (non-drifting) release of aggressive adhesives. However, the rhodium catalysed coating compositions generally require longer curing times than those catalysed with the commercially employed platinum catalysts. The trend in the coating industry is towards increased rates of throughput of the coated substrate. In addition, although variable, the cost of rhodium is relatively high. There has thus existed a need for a means whereby the curing time of the applied composition can be shortened and/or the proportion of rhodium catalyst required for satisfactory cure can be reduced.

According to the present invention there is provided a process for the preparation of a catalyst suitable for use in hydrosilylation reactions which comprises reacting (A) a rhodium complex represented by the general formula $Rh(R_2S)_3X_3$, in which each R represents an alkyl group having not more than 8 carbon atoms, a phenyl group or the $R^1_3SiQ$— group in which Q represents a divalent aliphatic hydrocarbon group having from 1 to 6 carbon atoms and each $R^1$ represents a group selected from alkyl groups having from 1 to 8 carbon atoms, aryl groups having from 6 to 8 carbon atoms and the $(CH_3)_3Si$— group, not more than one $R^1$ being $(CH_3)_3Si$— and X represents Cl or Br, with (B) an organohydrogen polysiloxane in which the organic substituents are selected from alkyl groups having up to 8 carbon atoms and phenyl groups, at least 70 per cent of the total organic groups being methyl, wherein there is present in the reaction mixture (C) an organo-siloxane having silicon-bonded groups selected from vinyl and allyl groups the remaining organic substituents being selected from alkyl groups having from 1 to 6 carbon atoms and phenyl, at least 50 percent of the total silicon-bonded substituents being methyl, and the ratio of silicon-bonded hydrogen atoms provided by (B) to each Rh atom provided by (A) is in the range from 0.5:1 to 6.0:1.

The sulphur-containing rhodium complexes (A) are known in the art. Those in which the R substituents do not contain silicon may be prepared according to the disclosure in, for example, Journal of the Chemical Society, (A), (1971), 899 and Journal of the Chemical Society, 1965, 2627. Complexes in which R contains the $R^1_3SiQ$— group can be prepared as described in GB Patent Specification No. 1 448 826. In the general formula of the complexes (A) each R may be, for example, methyl, ethyl, propyl, butyl, hexyl, phenyl, $(CH_3)_3SiCH_2$— or $(CH_3)_2(C_6H_5)SiCH_2CH_2$—, but is preferably isopropyl or n-butyl. The substituent X is preferably chlorine. Specific examples of the operative complexes (A) are $RhCl_3(Et_2S)_3$, $RhCl_3(Bu2S)_3$, $RhCl_3(PhEtS)_3$ and $RhCl_3[SEtCH_2Si(CH_3)_3]_3$ in which Et, Bu and Ph represent respectively the ethyl, butyl and phenyl groups.

As reactant (B) for use in the preparation of the catalyst there is employed an organohydrogen polysiloxane having at least one silicon-bonded hydrogen atom in the molecule and in which the organic substituents are selected from alkyl groups having up to 8 carbon atoms, and phenyl groups. At least 70 percent and preferably 100 percent of the total number of the silicon-bonded organic groups are methyl. The organohydrogen polysiloxanes may be homopolymers or copolymers, for example polymethylhydrogen siloxanes, trimethylsiloxy-terminated polymethylhydrogen-siloxanes and copolymers of dimethylsiloxane, methylhydrogensiloxane and trimethylsiloxane units. It is, however, preferred to employ as reactant (B) organohydrogen polysiloxanes in which the hydrogen is attached to silicon atoms occupying terminal positions in the chain, the most preferred organohydrogen polysiloxanes being copolymers of dimethylsiloxane units and dimethylhydrogen siloxane units $[(CH_3)_2HSiO$—]. In view of their greater reactivity it is also preferred that the organohydrogen polysiloxane should be of relatively short chain length, for example having from about 4 to about 50 silicon atoms.

As the organosiloxane (C) there may be employed any cyclic or substantially linear organosiloxane in which there are present at least two silicon-bonded groups per molecule selected from vinyl and allyl. The remaining silicon-bonded groups may be for example, methyl, ethyl, propyl, hexyl or phenyl, at least 50 percent of the total silicon-bonded groups being methyl. Examples of the operative organosiloxanes (C) are methylvinylcyclotetrasiloxane, tetramethyldivinyl disiloxane, copolymers of dimethylsiloxane and methylvinylsiloxane, copolymers of dimethylsiloxane, methylallylsiloxane and trimethylsiloxane and copolymers of dimethylsiloxane and phenylmethylvinylsiloxane. In order to avoid premature curing commercial compositions employing a hydrosilylation curing reaction are supplied with at least one of the three essential components packaged separately from the other two. According to one such arrangement some or all of the olefinically-unsaturated organosiloxane component may be contained in one package with the catalyst, the organohydrogensiloxane crosslinking component being packaged separately with any remainder of the olefinically-unsaturated organosiloxane. As a manufacturing convenience, therefore, we prefer, in suitable cases, to employ as organosiloxane (C) the vinyl- or allyl-containing organosiloxane which is intended to take part in the subsequent hydrosilylation cure.

The catalyst preparation process of this invention may be performed by simply mixing (A), (B) and (C) at ordinary ambient temperatures, normally about 15° to 25° C. In order to achieve the maximum degree of reaction at such temperatures it is preferred to allow the reaction mixture to 'age' for several hours, generally at least 2 hours, prior to use. However, if desired the rate of reaction may be increased by subjecting the reaction mixture to temperatures above normal ambient. Preferably such temperatures should not exceed about 70° C. as we believe that a hydrosilylation reaction involving (B) and (C) could then compete significantly with the desired reaction between (A) and (B). Solvents, for example toluene and xylene, may be employed to facilitate mixing of the reaction components.

The relative proportions of (A) and (B) employed in the reaction mixture should be such as to provide from 0.5:1 to 6.0:1 preferably from 0.9:1 to 2.0:1, reactive silicon-bonded hydrogen atoms per atom of rhodium. The proportion of the vinyl- or allyl-organosiloxane (C) employed is not critical but it is preferably such as to provide at least 2 vinyl or allyl groups per atom of rhodium. As stated hereinabove the organosiloxane (C) may comprise at least a portion of the unsaturated organosiloxane (designated X hereinafter) which is intended as the base polymer to take part in the curing process. In such cases the vinyl and/or allyl groups may be present in large multiples of the number of rhodium atoms.

The rhodium catalysts prepared according to this invention are useful for effecting catalysis of the reaction (hydrosilylation) involving the addition of silicon-bonded hydrogen to olefinically-unsaturated groups present in organic and organosilicon compounds. Included within the scope of this invention therefore are compositions comprising (X) an organic or organosilicon compound containing olefinic unsaturation, (Y) an organosilicon compound having at least one silicon-bonded hydrogen atom and (Z) a catalyst prepared according to this invention. In such compositions (X) may be for example pentene-1, hexene-2, heptene-1, butadiene, styrene, allyl ethers of poly(oxyalkylenes), $(CH_3)_2(CH_2=CH)SiCl$, and organopolysiloxanes having silicon-bonded vinyl, allyl and hexenyl groups including those exemplified hereinabove for reactant (C). Organosilicon compounds having at least one silicon-bonded hydrogen atom may be silanes, oligomeric siloxanes or polysiloxanes. Examples of such organosilicon compounds include $HSi(OC_2H_5)_3$, $(CH_3)HSi(OCH_3)_2$, $(C_2H_5)HSiCl_2$ and organohydrogen siloxanes as described and exemplified for (B) hereinabove such as polymethylhydrogen siloxanes, copolymers of dimethylsiloxane and methylhydrogen siloxane and copolymers of dimethylsiloxane and dimethylhydrogen siloxane. Both (X) and (Y) are well known substances in the organosilicon art.

Compositions comprising (X), (Y) and (Z) are useful in a variety of applications, for example as coating materials, potting compositions and electrical insulating materials. They are, however, particularly suitable for providing non-adherent and/or water repellent coatings on flexible substrates such as paper and plastic (e.g. polypropylene) films. The preferred compositions are therefore those which, on curing, give rise to a cross-linked elastomeric film and wherein (X) is a polydiorganosiloxane having at least two silicon-bonded, olefinically-unsaturated groups having from 2 to 6 carbon atoms and in which at least 90% of the remaining organic substituents are methyl, (Y) is a methylhydrogen polysiloxane having at least two silicon-bonded hydrogen atoms and in which the sum of silicon-bonded unsaturated groups per molecule of (X), plus silicon-bonded hydrogen atoms per molecule of (Y), is at least 5.

The compositions comprising (X), (Y) and (Z) may be applied to the substrates employing any appropriate technique, for example by immersion, doctor blade, gravure roll or plain roll. They may be applied to the substrate from solution or dispersion in organic solvent or water, or may be applied in solventless form as described for example in GB Patent Specification 1 476 314. The applied composition is then cured, temperatures of from about 100° C. to about 180° C. normally being appropriate.

If desired the coating compositions may contain compounds, for example, acetylene alcohols and carboxylic esters, which inhibit the cure reaction and prolong bath life of the compositions during use. Generally, however, the use of such inhibitors is not necessary. The compositions may also optionally contain ingredients for modifying the release characteristics of the cured coating, for example, resin copolymers of $(CH_2=CH)(CH_3)_2SiO_{0.05}$ units, $(CH_3)_3SiO_{0.05}$ units and $SiO_2$ units.

The following Examples in which the parts are expressed by weight and Bu represents the n-butyl group and Me the methyl group illustrate the invention.

EXAMPLE 1

A composition was prepared by mixing together the following

| | |
|---|---|
| Copolymer of dimethylsiloxane, methylvinylsiloxane and dimethylvinyl siloxane having viscosity of 350 mm$^2$/s at 25° C. | 98.1 parts |
| Methylvinylcyclotetrasiloxane | 1 part |
| RhCl$_3$(Bu$_2$S)$_3$ | 0.026 part |
| toluene | 0.814 part |

To equal (100 g) portions of this composition were then added quantities of HMe$_2$SiO(Me$_2$Sio)$_{16}$SiMe$_2$H as a 10% solution in toluene to provide a series of compositions A to E in which the ratios of silicon-bonded hydrogen atoms provided by the organohydrogen siloxane to Rh atoms present were respectively

| A | B | C | D | E |
|---|---|---|---|---|
| 1:1, | 1.5:1, | 2.0:1, | 2.5:1, | and 5.0:1. |

For comparative purposes a similar formulation (Ref) was prepared in which the hydrogensiloxane component was omitted. The compositions were then heated at 60° C. for 30 minutes and stored under ambient conditions (20° C.) for 60 days.

A poly(methylhydrogen) siloxane crosslinker having a viscosity of about 30 mm$_2$/s at 25° C. was stirred into each of the compositions in a proportion of 0.8 parts of crosslinker per 20 parts of composition. Each of the compositions was then blade-coated onto a glassine paper surface at a level of about 1.0 g per square meter. The minimum cure times at 120° C. were then determined by placing the coated paper samples in an oven at that temperature and examining the surface for smear and release properties at various exposure times. The following results were obtained.

| Composition | Cure time (Seconds) |
|---|---|
| Ref | 60 |
| A | 50 |
| B | 50 |
| C | 50 |
| D | 50 |
| E | 40 |

Samples of each of the coated papers were laminated immediately after curing with a) Tesa 7476 (elastomer) and Tesa 4970 (acrylic) test tapes. The laminates were stored at room temperature (20° C.) for 5 days and then tested for release performance. The test involved measuring the force required to pull off the test tape at a rate of 300 mm/min and gave the following results.

|  | Force (g/25 mm) | |
|---|---|---|
|  | 7476 | 4970 |
| Ref. | 37 | 57 |
| A | 33 | 59 |
| B | 36 | 63 |
| C | 36 | 66 |
| D | 35 | 107 |
| E | 37 | 96 |

EXAMPLE 2

Compositions Ref. A, B and D were prepared as described in Example 1 and to each composition (20 g) was added, with mixing, 1.2 g of a copolymer of dimethylsiloxane, methylhydrogensiloxane and trimethylsiloxane (30 mm$^2$/s at 25° C.) as crosslinker. The compositions were coated on to glassine paper and tested for cure rate and release force as Example 1. The results were as follows:

|  | Cure Time(sec) | Release force (g/25 mm) | |
|---|---|---|---|
|  |  | 7476 | 4970 |
| Ref. | 50 | 34 | 125 |
| A | 40 | 36 | 117 |
| B | 40 | 33 | 133 |
| D | 40 | 33 | 152 |

EXAMPLE 3

Coating compositions comprising a polymethylhydrogensiloxane and respectively compositions Ref. and A were prepared as described in Example 1. The cure rates of the two compositions at different temperatures were then measured by Differential Scanning Calorimetry employing a system comprising Mettler TA 3000, TC 10 TA processor and DSC 30 cell. According to such measurement the enthalpy of the reaction is determined by measuring the difference in heat flow between small cups, one containing the composition, the other being empty. From the enthalpy values the time taken for 99% reaction in the composition was determined.

The reaction times obtained at various temperatures were as follows.

|  | Time(minutes) | |
|---|---|---|
| Temperature(°C.) | Ref. | A |
| 100 | 83.94 | 8.00 |
| 120 | 14.50 | 1.19 |
| 150 | 1.42 | 0.10 |

That which is claimed is:

1. A process for treating a substrate which comprises (I) applying to a substrate a curable composition and, (II) thereafter curing the applied composition on the substrate, the curable composition comprising:
   (X) a compound containing olefinic unsaturation selected from organic and organosilicon compounds;
   (Y) an organosilicon compound having at least one silicon-bonded hydrogen atom and,
   (Z) a catalyst which is prepared by a process which comprises reacting:
   (A) a rhodium complex represented by the general formula Rh(R$_2$S)$_3$X$_3$, in which each R represents an alkyl group having not more than 8 carbon atoms, a phenyl group or the R'$_3$SiQ— group in which Q represents a divalent aliphatic hydrocarbon group having from 1 to 6 carbon atoms and each R' represents a group selected from alkyl groups having from 1 to 8 carbon atoms, aryl groups having from 6 to 8 carbon atoms and the (CH$_3$)$_3$Si— group, not more than one R' being (CH$_3$)$_3$Si—, and X represents Cl or Br, with
   (B) an organohydrogen polysiloxane in which the organic substituents are selected from alkyl groups having from 1 to 8 carbon atoms and phenyl groups, at least 70 percent of the total organic groups being methyl, wherein there is present in the reaction mixture
   (C) an organosiloxane having silicon-bonded groups selected from vinyl and allyl groups, the remaining organic substituents being selected from alkyl groups having from 1 to 6 carbon atoms and phenyl groups, at least 50 percent of the total silicon-bonded substituents being methyl, and the ratio of silicon-bonded hydrogen atoms provided by (B) to each Rh atom provided by (A) is in the range of 0.5:1 to 6:1, whereby the substrate is treated.

2. A process as claimed in claim 1 wherein the mode of application is immersion of the substrate in the curable composition and withdrawal of the substrate therefrom prior to curing.

3. A process as claimed in claim 1 wherein the mode of application of the curable composition to the substrate is by a doctor blade.

4. A process as claimed in claim 1 wherein the mode of application of the curable composition to the substrate is by a gravure roll.

5. A process as claimed in claim 1 wherein the mode of application of the curable composition to the substrate is by a plain roll.

6. A process as claimed in claim 1 wherein the mode of application of the curable composition to the substrate is by spraying the curable composition onto the substrate.

7. A process as claimed in claim 1 wherein the curing temperature is in the range of 100° C. to 180° C.

8. A process as claimed in claim 1 wherein the substrate is paper or plastic.

* * * * *